(12) United States Patent
Veltrop et al.

(10) Patent No.: US 8,166,871 B2
(45) Date of Patent: May 1, 2012

(54) FOOD PRODUCT STEAMER

(75) Inventors: Loren Veltrop, Chicago, IL (US); Don Van Erden, Wildwood, IL (US); Michael M. Maciejewski, Saint Charles, IL (US)

(73) Assignee: Prince Castle LLC, Carol Stream, IL (US)

( * ) Notice: Subject to any disclaimer, the term of this patent is extended or adjusted under 35 U.S.C. 154(b) by 873 days.

(21) Appl. No.: 12/249,125

(22) Filed: Oct. 10, 2008

(65) Prior Publication Data

US 2010/0089251 A1   Apr. 15, 2010

(51) Int. Cl.
*A47J 27/04* (2006.01)

(52) U.S. Cl. ............... 99/410; 99/415; 99/417; 99/418; 99/516; 126/369; 219/401

(58) Field of Classification Search .............. 99/410, 99/415, 417, 418, 516; 126/369; 219/401
See application file for complete search history.

(56) References Cited

U.S. PATENT DOCUMENTS

| | | | |
|---|---|---|---|
| 2,674,935 A * | 4/1954 | Lewis et al. ............ 99/473 |
| 3,500,818 A * | 3/1970 | Elias ...................... 99/467 |
| 3,814,901 A * | 6/1974 | Morhack ................ 219/401 |
| 4,291,617 A | 9/1981 | Miller et al. |
| 4,452,132 A | 6/1984 | Miller et al. |
| D279,854 S | 7/1985 | Miller et al. |
| 4,617,908 A | 10/1986 | Miller et al. |
| 4,982,656 A * | 1/1991 | Stone ..................... 99/403 |
| 6,516,709 B1 * | 2/2003 | Lin ........................ 99/331 |
| 6,909,070 B2 | 6/2005 | Veltrop |
| 6,996,334 B1 | 2/2006 | Parsons et al. |
| 7,222,563 B2 | 5/2007 | Reckert et al. |
| 7,328,654 B2 | 2/2008 | Shei |

* cited by examiner

*Primary Examiner* — Benjamin Layno
(74) *Attorney, Agent, or Firm* — Kelly & Krause, LP; Joseph P. Krause (57) ABSTRACT

A steamer for sandwich buns, bagels, croissants, cakes, vegetables, pastas, and other foods delivers fixed amounts of water onto a hot, dry platen through a vertically-oriented water conduit which is also thermally insulated from the hot platen and made from thermally insulating materials. The vertically-oriented water conduit retains water after a water supply is shut off at the beginning or end of a steam generating cycle. Orienting the conduit vertically reduces the surface area of liquid water exposed to air. Insulating the water conduit from the hot platen reduces the rate at which water standing in the conduit evaporates. Tubes used in the water conduit are insulating and easily removed from the water conduit assembly and flexible. Minerals that precipitate out of solution and become deposited onto the flexible tube are easily removed by flexing the flexible tube.

87 Claims, 5 Drawing Sheets

FOOD PRODUCT STEAMER

FIELD OF THE INVENTION

This invention generally relates to food steamers. More particularly, this invention relates to a steamer for food products that include sandwich buns, rolls, croissants and bagels, as well as pastas, vegetables and other food products.

BACKGROUND OF THE INVENTION

Steamers are used in the food service industry to treat bread and bread-type products prior to being served. When steam impregnates a bread-type food product, such as a sandwich roll, the steam tends to soften the bread product making the bread product seem fresher.

Steamers include both boiler-type steamers as well as flash steamers in which a volume of water is deposited or sprayed onto a hot surface, which "flashes" or converts the water to steam. A small, fixed amount of water is delivered onto a hot, dry surface which causes the water to be quickly boiled off and turned into steam.

A problem arises with prior art steamers when the water being boiled off contains minerals, as is the case with almost all water except for distilled water and "softened" water, which is that dissolved minerals precipitate out of solution when water evaporates. Over time, the precipitate builds up on surfaces from which the water evaporates, leaving an unsightly deposit that can also clog the water pathway. Prior art steamers that use horizontal water conduits are particularly susceptible to mineral build up because the horizontal pipe empties when the water supply is shut off between steam generating cycles.

Minerals like calcium carbonate and other solutes precipitate out of solution when the water they are dissolved in evaporates away, as happens when water is flashed into steam. Surfaces that have water evaporate from them will therefore tend to become encrusted with precipitate. Mineral deposits that form on the surfaces of water-carrying conduits will build up over time impeding its effectiveness. Solutes that precipitate out of the water will eventually build up until the water-carrying conduit is completely blocked, necessitating its replacement.

DETAILED DESCRIPTION

Figure 1:
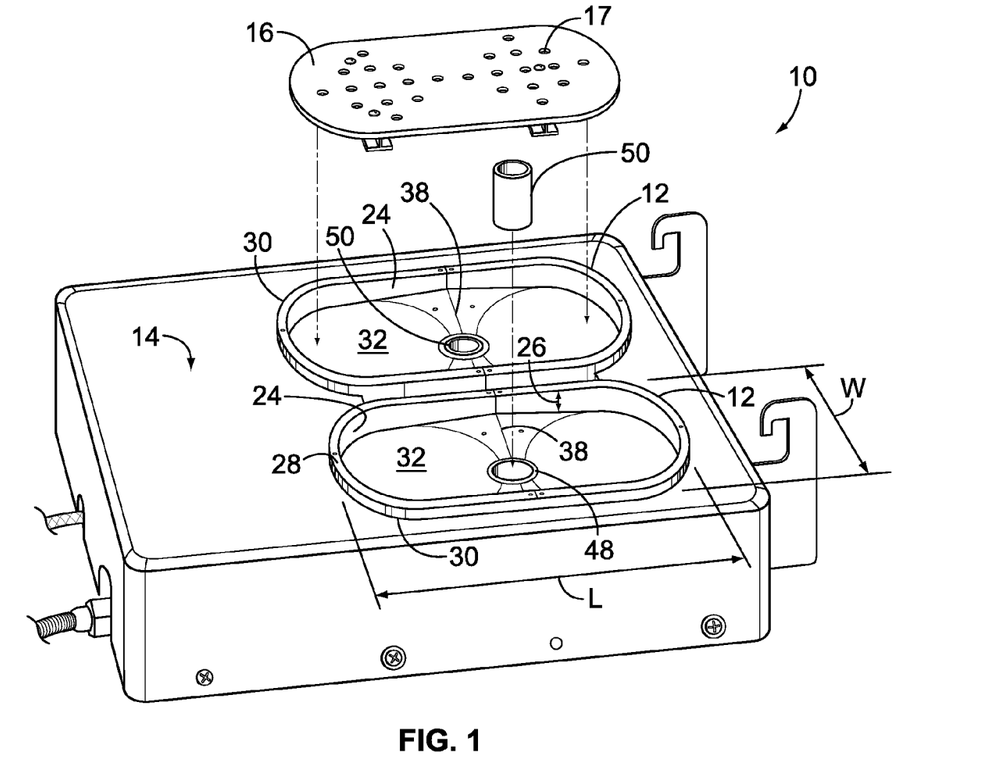
FIG. 1 is a perspective view of a steamer for food products.

A flash steamer for food products that reduces the rate at which minerals build up on water inlet conduit would be an improvement over the prior art. FIG. 1 is a perspective view of a preferred embodiment of a steamer apparatus 10 useful for steaming bread or other food products such as sandwich buns, rolls, croissants, bagels, cakes, vegetables, pasta and the like. As used herein, the term "food product" therefore includes all forms and types of bread products as well as all forms of vegetables and pasta.

The steamer apparatus 10 shown in FIG. 1 is comprised of two, side-by-side, oval or oblong cast aluminum basins 12 mounted in a cabinet 14 that encloses heating elements (not shown) and controls (not shown). In a quiescent state, the basins 12 are heated by a heater (not shown) embedded into the basin material or in thermal contact with the bottom side in order to keep the basin very hot and dry. The preferred quiescent surface temperature for the basins is about 150 degrees Celsius, however surface temperatures can range between about 120 and 210 degrees Celsius depending on the volume of water delivered to the platen or the amount of steam to be generated during a steam generating cycle, the time between each steam generating cycle, the mass of the platen and the specific heat of the material used to make the platen.

When a food product is to be steamed, the food product is held over the basin 12 by a spatula (not shown) while a controlled amount of water is delivered into the basin 12 from a thermally insulated water conduit 14. The water volume delivered into the basin 12, and the basin quiescent temperature are controlled so that when the water to steam a food product flows into the basin 12, all of the water delivered to the basin is flash boiled or "flashed" into steam almost immediately, but without over-steaming the food product so that it becomes soggy.

All of the water delivered into the basin 12 to steam a food product is eventually boiled off leaving the basin hot and dry. When the water has boiled off, another food product can be steamed. The steamer thus cyclically boils off fixed amounts of water.

A well-known consequence of pouring water onto a hot, dry surface is that large water droplets are generated, which are propelled upward, away from the hot surface. When large water droplets make contact with relatively cool surfaces of a food product, they condense on the food product and tend to wet the product rather than soften it. One or both of the steamer basins can be provided a thermally conductive, perforated screen or "venturi" plate 16 to prevent large water droplets from reaching a food product or other food product. The holes 17 in the venturi plate 16 allow steam, i.e., small water vapor droplets to reach the product to be steamed. The venturi plates thus insure that steam and not water droplets reach the food product.

For purposes of illustrating the structure of the steamer apparatus, FIG. 1 shows a venturi plate 16 in only the left-hand side basin. The right side basin 12 is shown without the venturi plate in order to depict an open orifice that is part of a water conduit assembly, which delivers water to the hot platen surfaces however both basins are operated with a venturi plate.

The venturi plates 16 are sized to fit freely into, and be readily removed from the basins 12. The venturi plates 16 are kept horizontal and at an elevation below the top surface of the basin sidewall but above the basin bottom by three or more thermally conductive posts (shown in FIG. 1A). Keeping the venturi plates above the basin bottom keeps the food product away from water that might not flash into steam but collect at the bottom of the basin instead.

It is important that a venturi plate be kept hot so steam droplets do not condense on the venturi plate 16 surfaces, which would tend to reduce the amount of steam reaching a food product. The venturi plate is therefore preferably made from thermally conductive material, i.e., material having a relatively high thermal conductivity coefficient k, such as cast aluminum so that the venturi plate can absorb and conduct throughout its mass, heat energy radiated from the basin, conducted through the conductive posts and contained in the steam.

Figure 1A:
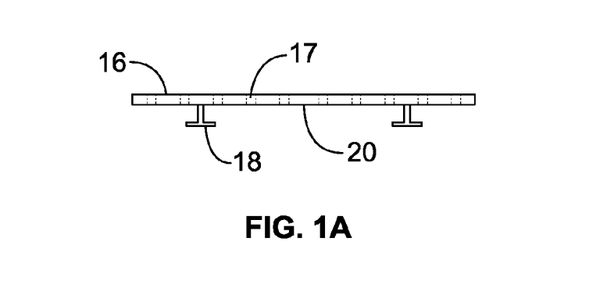
FIG. 1A is a side view of a venturi plate for the steamer depicted in FIG. 1.

As can be seen in FIG. 1A, thermally conductive metal posts 18 (not shown in FIG. 1) extend from the bottom 20 of the venturi plate 16 to the top surface 22 of the basin 12. They keep the venturi plate 16 above the water in the basin, level and at a predetermined height above the bottom of the basin 12. The posts also absorb heat energy from the basin and conduct it into the venturi plate 16.

Referring now to the basins 12, each basin 12 has a "top" surface 22, described more fully below, which is surrounded by a sidewall 24 orthogonal to the top surface 22 and which extends upwardly from the top surface 22 by a distance that defines a flat, level sidewall height 26. The sidewall 20 has a thickness that defines a sidewall top surface 28, which supports a spatula device (not shown) for holding food products over the basin 12.

The basins 12 depicted in the figures have semi-circular end portions 30. The radii of the end portions 30 shown in the figures are equal to each other and substantially equal to the radius of a hamburger bun (not shown). Alternate but equivalent embodiments of the steamer apparatus 10 include the use of basins 12 having other shapes that correspond to the shape of a food product to be steamed. Such shapes would include basins that are circular, square, rectangular or triangular. Despite the fact that the basins 12 shown in the figures are oblong, the basins 12 are considered to have a length and width dimensions, L and W, as shown in the figures.

The basins 12 are preferably formed from cast aluminum and are therefore unitary pieces. Particular features of the basins 12 are nevertheless described as if the basins 12 were comprised of a separate bottom portion, referred to herein as the basin platen 32 and the aforementioned sidewall 28. The features of the basin bottom or platen 32 are best seen in FIG. 2, et seq.

Figure 2:
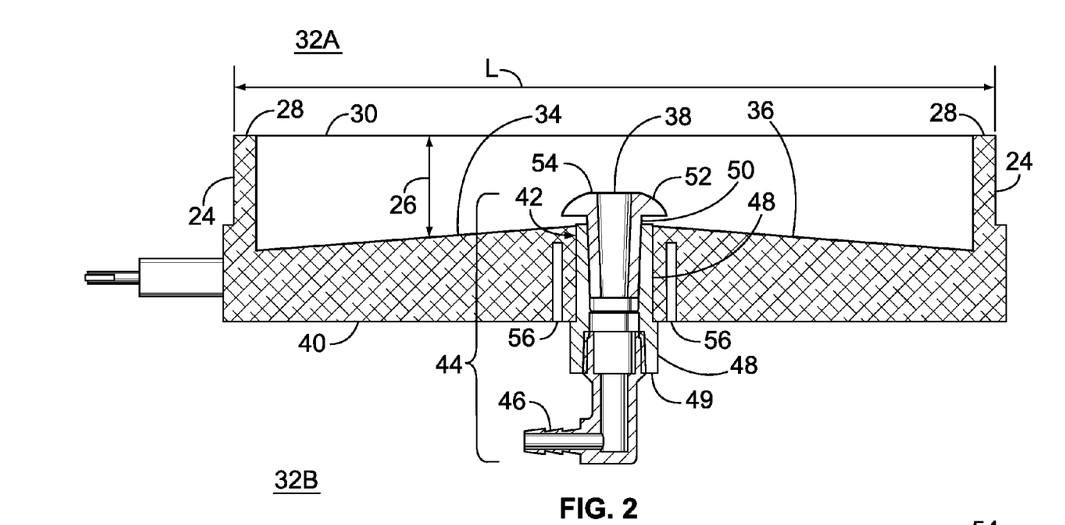
FIG. 2 is a cross section of one of the platens that form the basins shown in FIG. 1.

FIG. 2 is a cross section of one basin 12 along the length L or major axis of the basins 12 shown in FIG. 1. The basin 12 is comprised of a thermally conductive, cast aluminum heated platen portion 32 having two inclined surfaces 34 and 36 that meet near the center or middle of the oblong basin 12, forming an edge that defines an apex 38 for the platen 32 and the two inclined surfaces 34 and 36. Since the inclined surfaces 34 and 36 are part of the cast platen, they are inherently heated and kept hot by thermal energy supplied to the platen 32 from either an embedded resistive wire (not shown) or a gas burner. Heat energy supplied to the platen 32 is conducted through the platen 32 by virtue of its relatively high thermal conductivity.

It is important that water to be flashed into steam not form a puddle at the bottom of the basin, which is an area of the inclined surface adjacent the sidewall. Water that puddles in the basin will tend to boil with the resultant turbulence throwing off large water droplets. Puddle formation is avoided by selecting basin characteristics, e.g., dimensions, shape, material, surface roughness, basin mass and slope of the heated surfaces, and by selecting quiescent surface temperatures, such that the volume of water needing to be flashed into steam is vaporized before it can collect at the basin bottom. In a preferred embodiment depicted in FIG. 1, which uses a relatively heavy, cast aluminum platen having a surface roughness typical of that produced during common aluminum casting, and which kept the quiescent surface temperature of about 160 degrees Celsius the heated inclined surfaces 34 and 36 slope down and away from the apex 38 at an angle θ that is approximately 4 degrees measured relative to horizontal or the bottom surface 40 of the platen 32, which is planar and horizontal, in order to flash a volume of water needed to steam a hamburger bun. Alternate embodiments include inclination angles between zero degrees when the heated surfaces are horizontal (described below) up to and including about 15 degrees, relative to horizontal. In the preferred embodiment, both surfaces are inclined at the same angle θ so that water poured over them at the apex 38 tends to divide evenly over both surfaces 34 and 36, maximizing the rate at which the water is flashed into steam.

Figure 3:
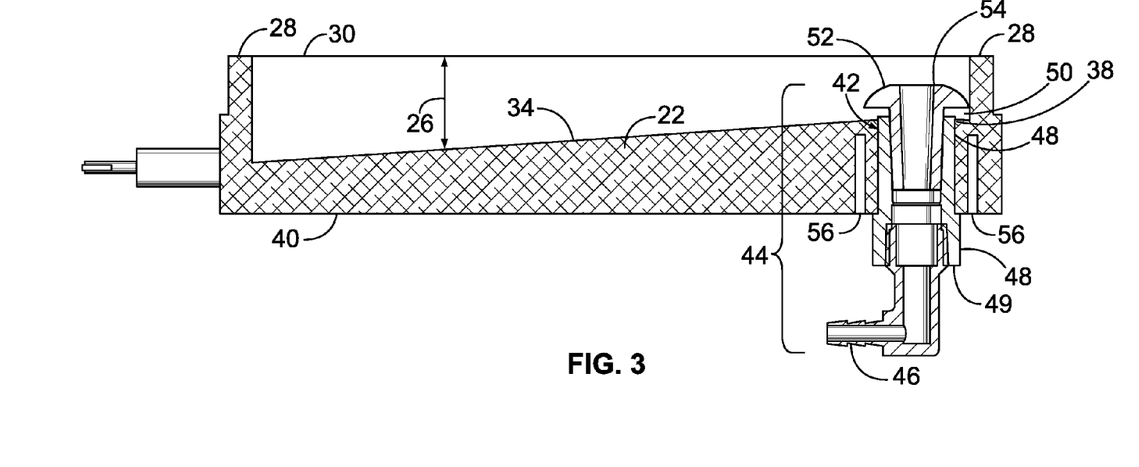
FIG. 3 is a cross section of an alternate embodiment of the platen shown in FIG. 2.

An alternate and embodiment of the steamer apparatus 10 inclines basins 12 having a single heated inclined surface (34 or 36), as shown in FIG. 3. In such an embodiment, water is supplied at or near the top or apex of the single inclined heated surface. As with the dual inclined surfaces shown in FIG. 2, water that flows over the single inclined heated surface is flashed into steam as it flows over the surface.

Referring again to FIG. 2, a through-hole 42 is formed in the platen 32 at the apex 32. The through-hole 42 extends completely through the platen's thickness, which is considered to be the distance between the inclined surfaces 34, 36 at the apex 38 and the substantially flat bottom surface 40, notwithstanding the fact that the surfaces 34 and 36 are sloping relative to the bottom because the angle of inclination θ is small and amount by which the thickness decreases near the sidewall is insignificant because the length of the inclined surfaces is relatively short.

The through-hole 42 is sized to accommodate a water conduit assembly 44. The water conduit assembly 44 is comprised of a water feed pipe 46 and two coaxial tubes or pipes 48 and 50. The tubes 48 and 50 are preferably made from materials that are poor thermal conductors in order to minimize conductive heat transfer from the platen 32, into water that stands in the water conduit assembly 44 between steam generating cycles.

The first tube 48 is rigidly fixed into the through-hole 42 by way of a threaded connection, high-temperature adhesive or an interference fit, in order to provide a water-tight seal between the exterior surface of the first tube 48 and the interior surface of the through-hole 42. A first end 49 of the first tube 48 is located below the bottom 40 of the platen 32 and threaded to receive the water feed tube 46.

The second tube 50 fits just inside the inner diameter of the first tube 48 and extends only part way down the first tube 48 to a flange 49 that limits the depth to which the second tube 50 can be inserted into the first tube 48. The second tube 50 is preferably made of a flexible plastic tubing having an outside diameter that fits snugly inside the inside diameter of the first tube 48 such that the second tube 50 is held inside the first tube 48 by friction.

An alternative embodiment of the water conduit uses a first tube 50 the insider surface of which is threaded to receive a second tube 50 the outside surface of which is threaded.

Whether the second tube 50 is threaded or held in place by friction, a flange 52 is preferably provided to the top or second end 54 of the second tube 50. As shown in the figure, the flange 52 extends over the second end of the first tube 48, part way over the first and second inclined surfaces 34 and 36 and provides a means for gripping the second tube 50 to facilitate its removal from the first tube 48.

In an alternate embodiment not shown, both tubes are flush with the heated inclined surfaces 34 and 36 of the platen 32, (or single surface in the embodiment using a single inclined surface). In another alternate embodiment, the end of the second coaxial tube 50 extends above the heated surface or surfaces of the platen in order to provide a larger volume of water left standing in the water conduit between steam generating cycles.

As was stated in the Background, a problem with prior art steamers is that dissolved minerals, such as calcium carbonate, tend to build up inside water conduits over time, especially horizontal water conduits. When a water conduit that delivers water to a steam generating platen is horizontal, the conduit carries water to the platen when the water supply is turned on. When the water supply is shut off, however, a small amount of water is always left on the interior surface of the water conduit. Water left in a water conduit or water left on the surfaces of a water conduit will inevitably evaporate leaving behind minerals that were dissolved in the water. Over time and after repeated steam cycles, minerals that precipitate out of solution build up and eventually clogs the water conduit. Preheating water before it leaves a water conduit only aggravates mineral build up.

In a preferred embodiment, the second tube 50 is made of a flexible material such that when the second tube 50 is removed from the first tube 48, it can be flexed and mineral deposits built up on the flexible surfaces are released. Once the built up minerals are released from the second tube 50, it can be reinstalled into the first tube and re-used.

It is also important that the water conduit assembly 44 is vertical. When the water supply to the steam generator 10 is turned on, the water conduit assembly 44 delivers water to the heated inclined surfaces. When the water supply is shut off, however, the vertically oriented water conduit assembly 44 will remain filled with water. Stated another way, water is left standing inside the second tube 50 of the conduit assembly 44 when the water supply is shut off.

Those of ordinary skill in the art know that the solubility of most minerals that are dissolved in water increases with temperature. Most dissolved minerals are usually left behind only when water evaporates. Water left standing in the second tube 50 will therefore tend to reduce mineral deposit formation in the second tube surface so long as water in the tube 50 does not evaporate.

The rate at which water will evaporate from inside the second tube 50 will be affected by the temperature of the water in the tube 50, the heat energy delivered into the tube 50 from the platen 28 but also the surface area of the water in the tube that is exposed to air. Orienting the water conduit assembly 44 vertically as shown in the figures retains water in the water conduit assembly 44 but it also significantly reduces the area of the water in the assembly 44 exposed to air to only the cross sectional area of the second pipe 50, which is inherently much less than the wetted surface area of a horizontal pipe used in prior art steamers to deliver water to a heated platen.

In order to further reduce the rate at which water evaporates from the water conduit 44 and the second tube 50 in particular, the water conduit assembly 44 is thermally insulated from the platen 32 by way of a thermal break 56. In one embodiment, the thermal break 56 is embodied as a channel or annulus formed into the platen 32 from its bottom surface 40. The channel is an open slot or groove formed into the bottom 40 of the platen having a depth such that the slot or groove extends "upwardly" from the bottom 40 surface of the platen 32 toward the top, inclined surfaces 34 and 36. When the slot is filled with air, or in an alternate embodiment, an insulating material such as ceramic, high temperature plastics, carbon fiber and glass, the amount of platen material conducting heat into the water conduit 44 is significantly reduced. Increasing the depth and/or width of the slot further decreases the ability of the platen to conduct heat energy into the water conduit assembly 44. The thermal break 56 formed by a channel in the bottom 40 of the platen 32 and around the water conduit thus reduces the heat transferred into water left standing in the conduit assembly, which slows water evaporation and reduces the rate at which minerals dissolved in the water will precipitate out of solution and onto the second tube 50 carrying water to be flashed into steam.

Minerals dissolved in water that is flashed into steam will of course build up over time on the platen. Those mineral deposits can of course be removed chemically, however, in one embodiment the platen is constructed of a relatively flexible aluminum sheet, which when flexed or twisted, causes built-up mineral deposits to flake off the basin surfaces.

Figure 4:
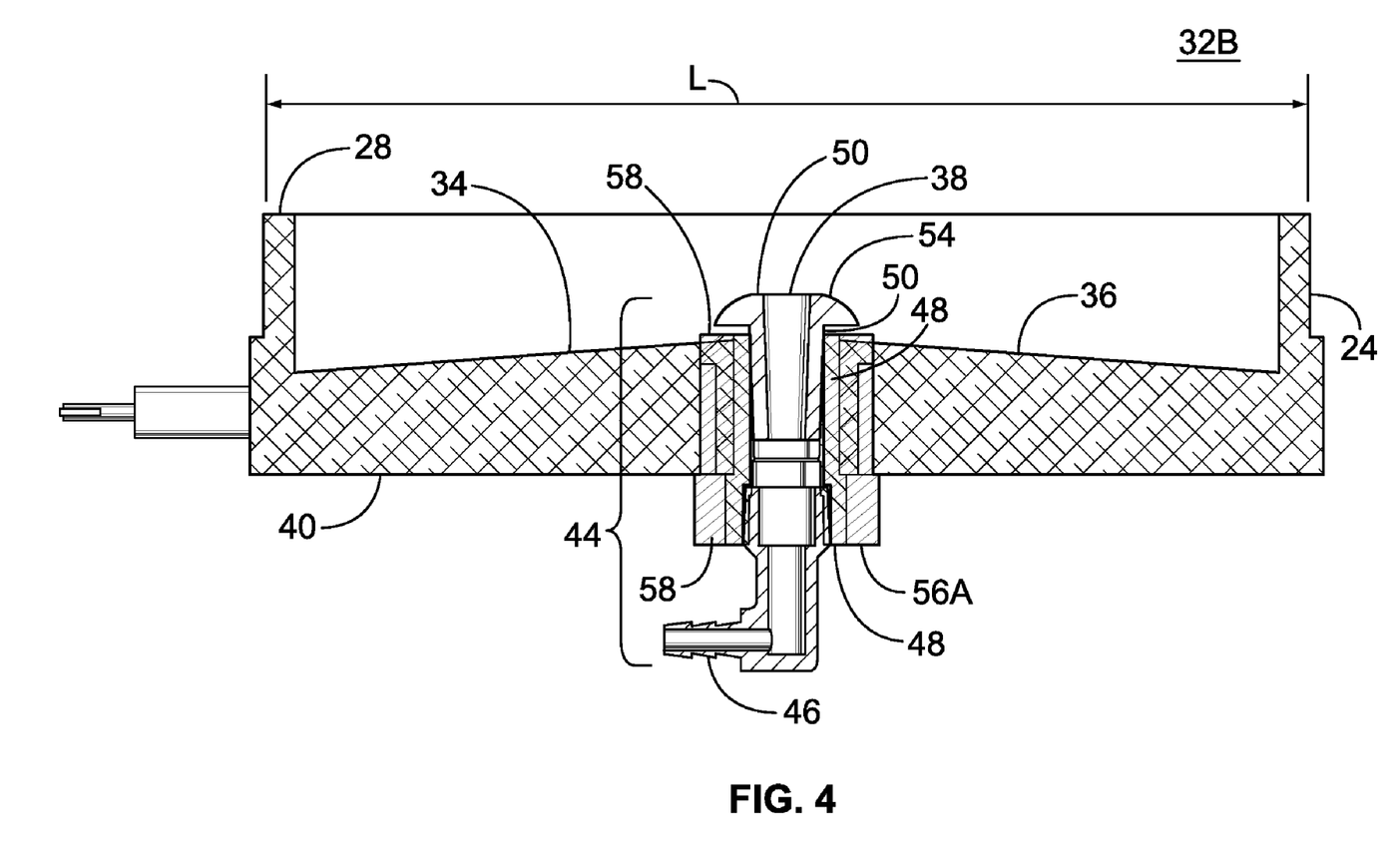
FIG. 4 is a cross section of an alternate embodiment of the platen shown in FIG. 2.

FIG. 4 is a cross section of yet another embodiment of a platen wherein the thermal break 56A is embodied as an insulating sleeve 58 that extends all the way through the thickness of the platen 32. In FIG. 4, the thermal break 56A is between the water conduit assembly 44 and the platen 32. Stated another way, no part of the hot platen 32 is in direct thermal contact with the water conduit assembly 44.

Figure 5:
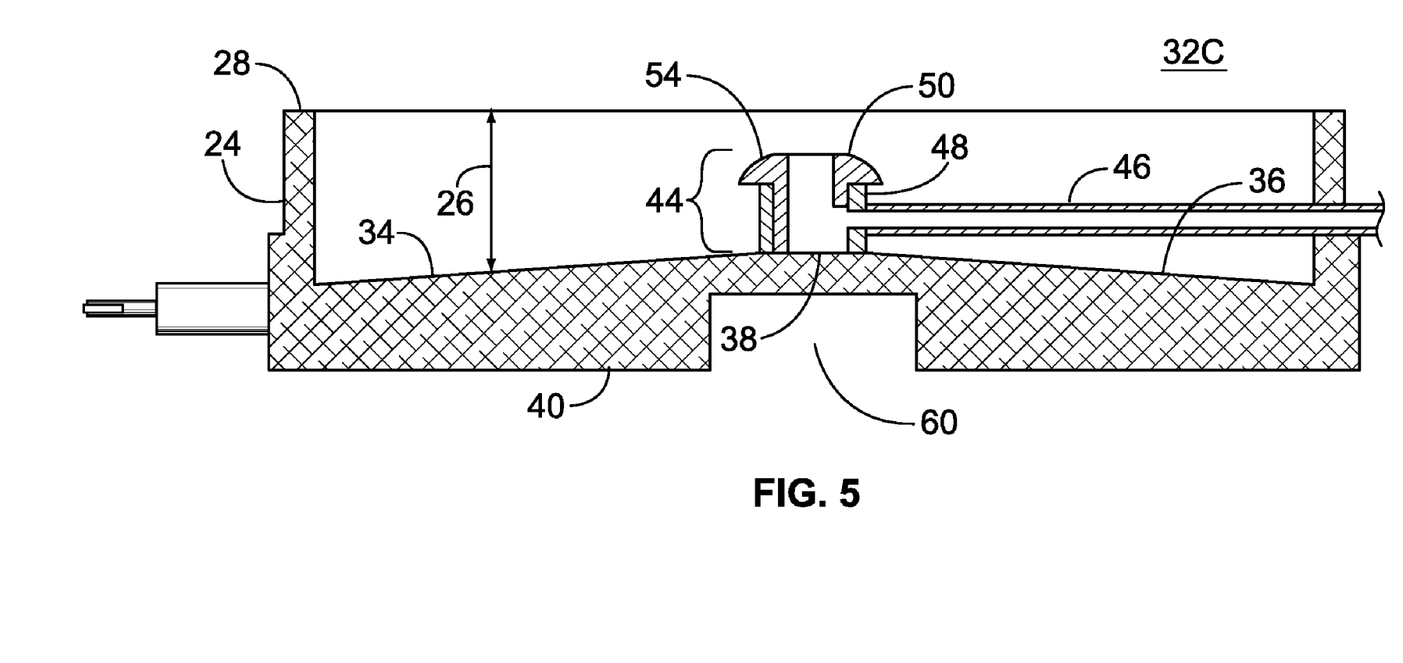
FIG. 5 is a cross section of yet another alternate embodiment of the platen shown in FIG. 2.

FIG. 5 is cross section of yet another embodiment wherein the water feed tube 46 extends through the sidewall 24 and above one of the inclined heated surfaces (34 or 36) of the platen 32. Unlike the embodiments shown in FIG. 2 and FIG. 4, the water conduit assembly 44 shown in FIG. 5 is not embedded in the hot platen but is instead located above the heated inclined surfaces of the platen 32, at the apex 38 where the two inclined surfaces meet. An air-filled void 60 to cool the water conduit assembly 44 can be formed into the bottom 40 of the platen 32 below the water conduit assembly 44.

It should be noted that while a preferred embodiment of the steamer apparatus uses two heated and inclined steam generating surfaces with the vertically-oriented water conduit located at or near the apex of the two surfaces, an alternate embodiment uses a single, heated and inclined steam generating surface with the vertically-oriented water conduit located at or near the apex formed by the intersection of the single surface with the sidewall, as shown in FIG. 3. Another embodiment uses a heated steam generating surface that is not inclined but is instead horizontal with the vertically oriented water conduit located anywhere in the platen. As mentioned above, the basin shape can be changed to be circular, square, rectangular or triangular, in part to match the steam generating pattern to the shape of a food product. Other alternate embodiments therefore include platens that are round, square, rectangular or triangular. Those of ordinary skill in the art will recognize that heated platens having one or more heated and inclined surface with a center or substantially center-mounted and vertically oriented water conduit would be a truncated cone for a round platen, and four and three-sided truncated pyramids respectively for square, rectangular and triangular platens. A truncated cone cross section and a truncated pyramid cross section would have the same shape as the cross section depicted in FIG. 2. For purposes of brevity, the cross section shown in FIG. 2 therefore also depicts the cross sections of a truncated cone and truncated pyramid-shaped platens that would be used in a steamer apparatus having circular, square, rectangular or triangular platens with inclined surfaces.

In order for water to be flashed into steam, it is important that the water delivered to the heated surface be distributed over the heated surfaces as quickly and as widely as possible. In addition to the various parameters mentioned and described above, surface wettability and roughness will also affect how quickly liquid water can cover the inclined surfaces.

As used herein, surface roughness is considered to be the arithmetic average deviation from the center line of the surface when viewed from the side, or RMS, which is the root mean square of the deviations from the center line of the surface where the surface center line is determined with respect to the highest or greatest average surface peak and lowest or deepest average surface depression. Surface roughness below about 5 μm. tends to be too smooth and allows water to run off the inclined surfaces to the bottom of the basin adjacent the sidewall where too much water can puddle and not flash into steam. Surface roughness greater than 40 μm can make the removal of mineral deposits from the heated surfaces difficult to accomplish.

Surface wettability can be enhanced by a layer of salt. In one embodiment, the inclined heated surfaces are provided a layer of salt by evaporating a small amount of brine.

Figure 6:
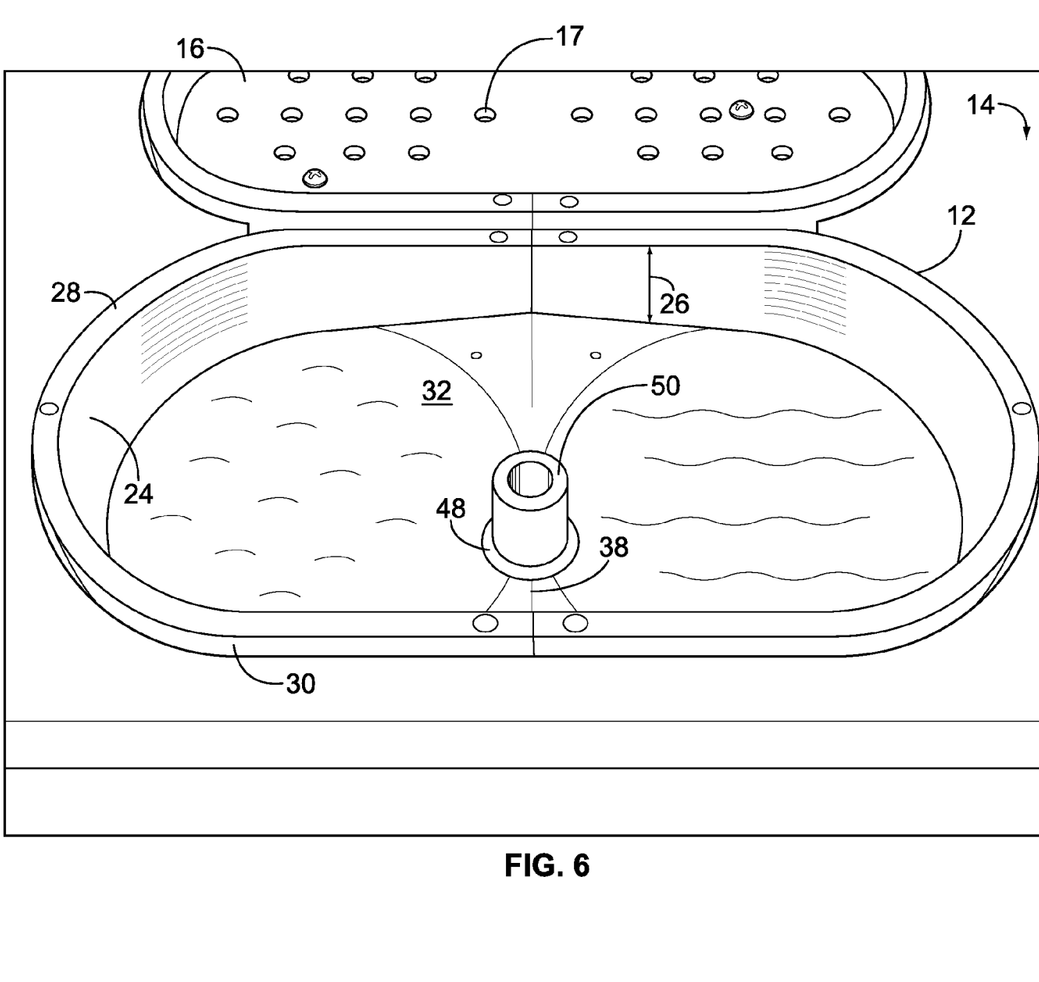
FIG. 6 is a depiction of a platen having two inclined surfaces, one of which has bumps the other of which has undulations.

In addition to surface roughness, contours and shapes formed into the inclined surfaces also affect how quickly or slowly water is flashed into steam. Concentric or radial ribs formed into the inclined surfaces will resist or enhance the flow of water down the inclined surfaces as will bumps or other gross surface irregularities. FIG. 6 shows a platen having two inclined surfaces, the left-hand side of which has bumps, the right-hand side of which has undulations.

The steamer described above and depicted in the figures is useful for steaming food products that include bread products like, buns, rolls, bagels and croissants. It is also useful for steaming other foods, such as fresh and frozen pastas and fresh and frozen vegetables as well.

The foregoing description and the accompanying figures are purposes of illustrating the invention and should not be considered as limiting the invention to embodiments described above or depicted in the figures. The scope of the invention is defined by the appurtenant claims.

What is claimed is:

1. A steamer apparatus for steaming food products comprised of:
   a thermally conductive heated platen having a top surface and a bottom surface and a thickness defined by a separation distance between the top and bottom, the top surface being comprised of a heated and inclined steam-generating surface having an apex; and
   a water conduit delivering water onto the heated and inclined steam-generating surface proximate to the apex such that water can flow downward over the heated and inclined steam-generating surface and be flash-converted into steam said water conduit having an opening from which water is emitted and flows onto the heated and inclined steam-generating surface, said water conduit being thermally insulated from the heated platen and the heated and inclined steam-generating surface.

2. The steamer apparatus of claim 1 wherein said heated and inclined steam-generating surface is substantially planar.

3. The steamer apparatus of claim 1, wherein said water conduit is oriented vertically.

4. The steamer apparatus of claim 3 wherein the thermally conductive heated platen is at least one of:
   a truncated cone; and
   a truncated pyramid.

5. The steamer apparatus of claim 1 wherein said heated and inclined steam generating surface has a surface roughness such that water emitted from said water conduit distributes itself across substantially the entire surface.

6. The steamer apparatus of claim 5 further comprised of a heater thermally coupled to the heated platen and which is capable of heating the inclined surface to a temperature of between approximately 120 and 210 degrees Celsius.

7. The steamer apparatus of claim 1 wherein said heated and inclined steam generating surface has a surface roughness between about 5 and 40 μm.

8. The steamer apparatus of claim 1 wherein said heated and inclined steam-generating surface is provided at least one of:
   ribs;
   spiral grooves; and
   bumps.

9. The steamer apparatus of claim 1, further comprised of:
   a through-hole that extends through the thickness of the platen, said through-hole being located proximate the apex; and
   wherein said water conduit extends through said through-hole.

10. The steamer apparatus of claim 9 further including a thermal break in the through-hole and between said platen and water conduit, the thermal break having a thermal conductivity less than the platen and being sized, shaped and arranged to reduce heat transfer into the water conduit from the heated platen.

11. The steamer apparatus of claim 9 wherein said platen is comprised of a thermal break around the through-hole, the thermal break being sized, shaped and arranged to reduce heat transfer into the water conduit from the heated platen.

12. The steamer apparatus of claim 9, wherein said water conduit is comprised of first and second coaxial tubes wherein water flows through the second tube and onto the heated and inclined steam-generating surface.

13. The apparatus of claim 12, wherein said heated platen has a thermal conductivity coefficient k, and wherein at least one of said coaxial tubes have a thermal conductivity coefficient less than k.

14. The apparatus of claim 12 wherein the first tube is fixed in the heated platen and wherein the second tube is removable from the first tube.

15. The steamer apparatus of claim 12, wherein:
   said first tube is fixed in the heated platen by at least one of:
      a threaded connection;
      an adhesive;
      an interference fit; and
   wherein the second tube is held in the first tube by at least one of:
      friction and threads.

16. The steamer apparatus of claim 12 wherein the second tube has a first end inside the first tube and located below the heated and inclined steam-generating surface, said second tube having a second end that includes a flange that extends at least part way over the first tube.

17. The steamer apparatus of claim 12 wherein the first and second tubes each have first and second ends, the first ends of the first and second tubes being located below the heated and inclined steam-generating surface of the platen, and at least part of the second ends of the first and second tubes being co-planar with the heated and inclined steam-generating surface.

18. The steamer apparatus of claim 12 wherein the first and second tubes each have first and second ends, the first ends of the first and second tubes being located below the heated and inclined steam-generating surface of the platen and wherein the first and second tubes each have second ends, the second end of the first tube being co-planar with the heated and inclined surface, and wherein the second end of the second tube extends above the second end of the first tube and above the heated and inclined steam-generating surface.

19. The steamer apparatus of claim 12, wherein the heated and inclined steam generating surface has a thermal conductivity coefficient k, and wherein said steamer apparatus is further comprised of a thermal break substantially surrounding the water conduit, said thermal break being comprised of substance having a thermal conductivity coefficient less than k.

20. The steamer apparatus of claim 19, wherein the thermal break is a channel formed into the bottom surface of the platen, the channel having a width and a depth, the depth extending from the bottom surface of the platen part way through the platen thickness toward the heated and inclined steam-generating surface.

21. The steamer apparatus of claim 20 wherein the channel is comprised of annulus circumscribing the water conduit proximate to where it passes through the platen, said annulus extending from the bottom of the platen, part way through the platen thickness toward the heated and inclined steam-generating surface.

22. The steamer apparatus of claim 21 wherein the annulus is air filled.

23. The steamer apparatus of claim 21 wherein the annulus is filled with at least one of: ceramic; high temperature plastic; carbon fiber and glass fabric.

24. The steamer apparatus of claim 20 wherein the channel is air filled.

25. The steamer apparatus of claim 1 further comprised of a water supply pipe for said water conduit, which delivers water to said water conduit and which extends from said water conduit over at least part of said heated and inclined steam-generating surface.

26. The steamer apparatus of claim 1 wherein said water conduit is comprised of a flexible pipe that has a flexible surface whereby mineral deposits that solidify on said flexible surface can be removed there from by flexing the flexible pipe.

27. The steamer apparatus of claim 1 further comprised of a water valve that effectuates dispensing fixed amounts of water from the water conduit such that the amount of dispensed water is flashed into steam as it flows over the heated inclined surface.

28. The steamer apparatus of claim 1 wherein the heated and inclined steam-generating surface is inclined at an angle between 0 and 15 degrees relative to horizontal.

29. The steamer apparatus of claim 1 further comprised of a side wall extending at least part way around the heated and inclined steam-generating surface, said side wall having a top surface.

30. The steamer apparatus of claim 29 wherein said cast metal material includes aluminum, and wherein the substantially planar, heated and inclined steam-generating surface is wettable.

31. The steamer apparatus of claim 29, including a thermally-conductive and perforated top venturi plate spaced above the inclined, heated steam-generating surface.

32. The steamer apparatus of claim 31, wherein the venturi plate is below the top surface of the side wall.

33. The apparatus of claim 31 wherein the venture plate is comprised of at least one thermally-conductive post that supports the venturi plate and which rests on the heated and inclined steam-generating surface, said at least one thermally-conductive post conducting heat energy into the venture plate.

34. The steamer apparatus of claim 1 wherein said heated platen is fabricated of cast metal.

35. The steamer apparatus of claim 1 wherein the heated and inclined steam-generating surface includes a layer of a salt.

36. The steamer apparatus of claim 1 wherein the heated and inclined steam-generating surface is a truncated cone.

37. A steamer apparatus for steaming food products comprised of:
a thermally conductive heated platen having a top surface and a bottom surface and a thickness defined by a separation distance between the top and bottom, the top surface being comprised of a first and second heated and inclined steam-generating surfaces that meet at an apex for said inclined surfaces; and
a water conduit delivering water onto the heated and inclined steam-generating surfaces proximate to the apex such that water can flow downward over the heated and inclined steam-generating surfaces and be flash-converted into steam said water conduit having an opening from which water is emitted and flows onto the heated and inclined steam-generating surfaces, said water conduit being thermally insulated from the heated platen and the heated and inclined steam-generating surfaces.

38. The steamer apparatus of claim 37 wherein said heated and inclined steam-generating surfaces are substantially planar.

39. The steamer apparatus of claim 37, wherein said water conduit is oriented vertically.

40. The steamer apparatus of claim 37 wherein said heated and inclined steam generating surfaces have a surface roughness such that water emitted from said water conduit is distributed substantially uniformly across both of the inclined steam generating surfaces.

41. The steamer apparatus of claim 37 wherein said heated and inclined steam generating surface has a surface roughness between about 5 and 40 μm.

42. The steamer apparatus of claim 37 wherein said heated and inclined steam-generating surface is provided at least one of:
ribs;
spiral grooves; and
bumps.

43. The steamer apparatus of claim 37, further comprised of:
a through-hole that extends through the thickness of the platen, said through-hole being located proximate the apex; and
wherein said water conduit extends through said through-hole.

44. The steamer apparatus of claim 43 further including a thermal break in the through-hole and located between said platen and water conduit, the thermal break being made of a material having a thermal conductivity less than the platen.

45. The steamer apparatus of claim 43 wherein said platen is comprised of a thermal break around the through-hole, the thermal break having a thermal conductivity less that the platen and being sized, shaped and arranged to reduce heat transfer into the water conduit from the heated platen.

46. The steamer apparatus of claim 43, wherein said water conduit is comprised of first and second coaxial tubes wherein water flows through the second tube and onto the heated and inclined steam-generating surface.

47. The apparatus of claim 46, wherein said heated platen has a thermal conductivity coefficient k, and wherein at least one of said coaxial tubes have a thermal conductivity coefficient less than k.

48. The steamer apparatus of claim 46 wherein the first tube is fixed in the heated platen and wherein the second tube is removable from the first tube.

49. The steamer apparatus of claim 46, wherein:
said first tube is fixed in the heated platen by at least one of:
a threaded connection;
an adhesive;
an interference fit; and
wherein the second tube is held in the first tube by at least one of:
friction and threads.

50. The steamer apparatus of claim 46 wherein the second tube has a first end inside the first tube and located below the heated and inclined steam-generating surface, said second tube having a second end that includes a flange that extends at least part way over the first tube.

51. The steamer apparatus of claim 46 wherein the first and second tubes each have first and second ends, the first ends of the first and second tubes being located below the heated and inclined steam-generating surface of the platen, and at least part of the second ends of the first and second tubes being co-planar with the heated and inclined steam-generating surface.

52. The steamer apparatus of claim 46 wherein the first and second tubes each have first and second ends, the first ends of the first and second tubes being located below the heated and inclined steam-generating surface of the platen and wherein the first and second tubes each have second ends, the second end of the first tube being co-planar with the heated and inclined surface, and wherein the second end of the second tube extends above the second end of the first tube and above the heated and inclined steam-generating surface.

53. The steamer apparatus of claim 46, wherein the heated and inclined steam-generating surfaces have a thermal conductivity coefficient k, and wherein said steamer apparatus is further comprised of a thermal break substantially surrounding the water conduit, said thermal break being comprised of substance having a thermal conductivity coefficient less than k.

54. The steamer apparatus of claim 53, wherein the thermal break is a channel formed into the bottom surface of the platen.

55. The steamer apparatus of claim 54 wherein the channel is comprised of annulus circumscribing the water conduit proximate to where it passes through the platen, said annulus extending from the bottom of the platen, part way through the platen thickness toward the heated and inclined steam-generating surface.

56. The steamer apparatus of claim 55 wherein the annulus is air filled.

57. The steamer apparatus of claim 55 wherein the annulus is filled with at least one of: ceramic; high temperature plastic; carbon fiber and glass fabric.

58. The steamer apparatus of claim 54 wherein the channel is air filled.

59. The steamer apparatus of claim 37 further comprised of a water supply pipe for said water conduit, which delivers water to said water conduit and which extends from said water conduit over at least part of said heated and inclined steam-generating surface.

60. The steamer apparatus of claim 37 wherein said water conduit includes a flexible pipe that has a flexible surface whereby mineral deposits that solidify on said flexible surface can be removed there from by flexing the flexible pipe.

61. The steamer apparatus of claim 37 further comprised of a water valve that effectuates dispensing fixed amounts of water from the water conduit such that the amount of dispensed water is flashed into steam as it flows over the heated inclined surface.

62. The steamer apparatus of claim 37 further comprised of a heater thermally coupled to the heated platen and which is capable of heating the inclined surfaces to a temperature of between approximately 120 and 210 degrees Celsius.

63. The steamer apparatus of claim 37 wherein the heated and inclined steam-generating surfaces are inclined at an angle between 0 and 15 degrees relative to horizontal.

64. The steamer apparatus of claim 37 further comprised of a side wall extending at least part way around the heated and inclined steam-generating surface, said side wall having a top surface.

65. The steamer apparatus of claim 37 wherein said heated platen is fabricated of cast metal.

66. The steamer apparatus of claim 65 wherein said cast metal material includes aluminum, and wherein the substantially planar, heated and inclined steam-generating surface is wettable.

67. The steamer apparatus of claim 37 wherein the heated and inclined steam-generating surfaces include a layer of a salt.

68. The steamer apparatus of claim 37, including a thermally-conductive and perforated top venturi plate spaced above the inclined, heated steam-generating surfaces.

69. The steamer apparatus of claim 68 wherein the venture plate is comprised of at least one thermally-conductive post that supports the venturi plate and which rests on the heated and inclined steam-generating surface, said at least one thermally-conductive post conducting heat energy into the venture plate.

70. A steamer apparatus for steaming food products comprised of:
a thermally conductive heated platen having a top surface and a bottom surface and a thickness defined by a separation distance between the top and bottom, the top surface being comprised of a horizontal steam-generating surface;
a water conduit delivering water onto the heated steam-generating surface, said water conduit being thermally insulated from the heated platen and the heated steam-generating surface;
a through-hole that extends through the thickness of the platen; and
wherein said water conduit extends through said through-hole; and
a thermal break in the through-hole and located between said platen and water conduit, the thermal break having a thermal conductivity less than the platen and being sized, shaped and arranged to reduce heat transfer into the water conduit from the heated platen.

71. The steamer apparatus of claim 70, wherein said water conduit is oriented vertically.

72. The steamer apparatus of claim 70 wherein said water conduit is comprised of a flexible pipe that has a flexible surface whereby mineral deposits that solidify on said flexible surface can be removed there from by flexing the flexible pipe.

73. The steamer apparatus of claim 70, wherein said water conduit is comprised of first and second coaxial tubes wherein water is able to flow through the second tube and onto the steam-generating surface.

74. The apparatus of claim 73 wherein the first tube is fixed in the heated platen and wherein the second tube is removable from the first tube.

75. The steamer apparatus of claim 73, wherein:
said first tube is fixed in the heated platen by at least one of:
- a threaded connection;
- an adhesive;
- an interference fit; and wherein the second tube is held in the first tube by at least one of:
- friction and threads.

76. The steamer apparatus of claim 73 wherein the second tube has a first end inside the first tube and located below the heated and inclined steam-generating surface, said second tube having a second end that includes a flange that extends at least part way over the first tube.

77. The apparatus of claim 70, wherein said heated platen has a thermal conductivity coefficient k, and wherein at least one of said coaxial tubes have a thermal conductivity coefficient less than k.

78. The steamer apparatus of claim 70 further comprised of a heater thermally coupled to the heated platen and which is capable of heating the surface to a temperature of between approximately 120 and 210 degrees Celsius.

79. The steamer apparatus of claim 70, wherein the steam-generating surface has a thermal conductivity coefficient k, and wherein said steamer apparatus is further comprised of a thermal break substantially surrounding the water conduit, said thermal break being comprised of substance having a thermal conductivity coefficient less than k.

80. The steamer apparatus of claim 79, wherein the thermal break is a channel formed into the bottom surface of the platen, the channel having a width and a depth, the depth extending from the bottom surface of the platen part way through the platen thickness toward the heated and inclined steam-generating surface.

81. The steamer apparatus of claim 80 wherein the channel is comprised of annulus circumscribing the water conduit proximate to where it passes through the platen, said annulus extending from the bottom of the platen, part way through the platen thickness toward the heated and inclined steam-generating surface.

82. The steamer apparatus of claim 70 wherein the steam-generating surface includes a layer of a salt.

83. The steamer apparatus of claim 70, including a thermally-conductive and perforated top venturi plate spaced above the steam-generating surface.

84. The steamer apparatus of claim 83 wherein the venture plate is comprised of at least one thermally-conductive post that supports the venturi plate and which rests on the steam-generating surface, said at least one thermally-conductive post conducting heat energy into the venture plate.

85. A steamer apparatus for steaming food products comprised of:
- a thermally conductive heated platen having a top surface and a bottom surface and a thickness defined by a separation distance between the top and bottom, the platen being comprised of a flexible heated and inclined steam-generating surface having an apex; and
- a water conduit delivering water onto the flexible steam-generating surface proximate to the apex such that water can flow downward over the heated and inclined steam-generating surface and be flash-converted into steam said water conduit having an opening from which water is emitted and flows onto the heated and inclined steam-generating surface, said water conduit being thermally insulated from the heated platen and the heated and inclined steam-generating surface.

86. The steamer apparatus of claim 85, wherein said flexible surface is substantially planar.

87. The steamer apparatus of claim 85, wherein said water conduit is oriented vertically.

* * * * *